(12) United States Patent
Kim et al.

(10) Patent No.: US 7,862,096 B2
(45) Date of Patent: Jan. 4, 2011

(54) UPPER GLOVE BOX ASSEMBLY

(75) Inventors: Yoon Kim, Windsor (CA); Thomas J. Luckett, Saline, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 259 days.

(21) Appl. No.: 12/183,766

(22) Filed: Jul. 31, 2008

(65) Prior Publication Data

US 2010/0026030 A1 Feb. 4, 2010

(51) Int. Cl.
B60R 7/06 (2006.01)
(52) U.S. Cl. .................................. 296/37.12
(58) Field of Classification Search ............... 296/37.1, 296/37.8, 37.12; 224/483, 539; 220/811
See application file for complete search history.

(56) References Cited

U.S. PATENT DOCUMENTS

| | | | | |
|---|---|---|---|---|
| 4,355,837 A * | 10/1982 | Shimizu et al. | .......... | 296/37.12 |
| 4,552,399 A * | 11/1985 | Atarashi | .................. | 296/37.12 |
| 4,663,210 A * | 5/1987 | Schreiber et al. | ............. | 428/160 |
| 5,071,162 A * | 12/1991 | Takagawa | ................... | 280/752 |
| 5,520,313 A * | 5/1996 | Toshihide | ................... | 224/539 |
| 5,829,814 A * | 11/1998 | Niessner et al. | .......... | 296/37.12 |
| 6,499,788 B2 * | 12/2002 | Ito et al. | ..................... | 296/70 |
| 6,669,258 B1 * | 12/2003 | Kato | .......................... | 296/1.01 |
| 6,883,680 B2 * | 4/2005 | Hirose | ......................... | 220/830 |
| 6,896,308 B2 * | 5/2005 | Okanda et al. | ............ | 296/37.12 |
| 7,144,060 B2 * | 12/2006 | Kim | ........................ | 296/37.12 |
| 7,188,871 B2 * | 3/2007 | Nemoto et al. | ............ | 292/170 |
| 7,226,102 B2 * | 6/2007 | Yang | ...................... | 296/37.12 |
| 7,341,300 B2 | 3/2008 | Miller et al. | | |
| 7,478,857 B2 * | 1/2009 | Jeon | ........................ | 296/37.12 |
| 7,533,919 B2 * | 5/2009 | Sauer | ...................... | 296/37.12 |
| 2002/0084666 A1 * | 7/2002 | Toppani | ................... | 296/37.12 |
| 2003/0080131 A1 * | 5/2003 | Fukuo | ....................... | 220/264 |
| 2003/0178434 A1 * | 9/2003 | Kato | ........................... | 220/811 |
| 2004/0041426 A1 * | 3/2004 | Lee | ........................... | 296/37.12 |
| 2004/0189012 A1 | 9/2004 | Katou et al. | | |
| 2010/0001539 A1 * | 1/2010 | Kikuchi et al. | ............. | 292/138 |

FOREIGN PATENT DOCUMENTS

| | | | |
|---|---|---|---|
| EP | 668189 A1 | * | 8/1995 |
| EP | 1048525 A1 | * | 11/2000 |
| EP | 1193129 A1 | * | 4/2002 |

* cited by examiner

Primary Examiner—H Gutman

(57) ABSTRACT

An upper glove box for the passenger side of an automotive vehicle in which a door is upwardly hinged and has an upper edge that is received into a void defined in the instrument panel when the door is opened. The revealed wall forward of the opening of the void is an integral portion of the foam injected instrument panel to provide the desired aesthetics.

13 Claims, 3 Drawing Sheets

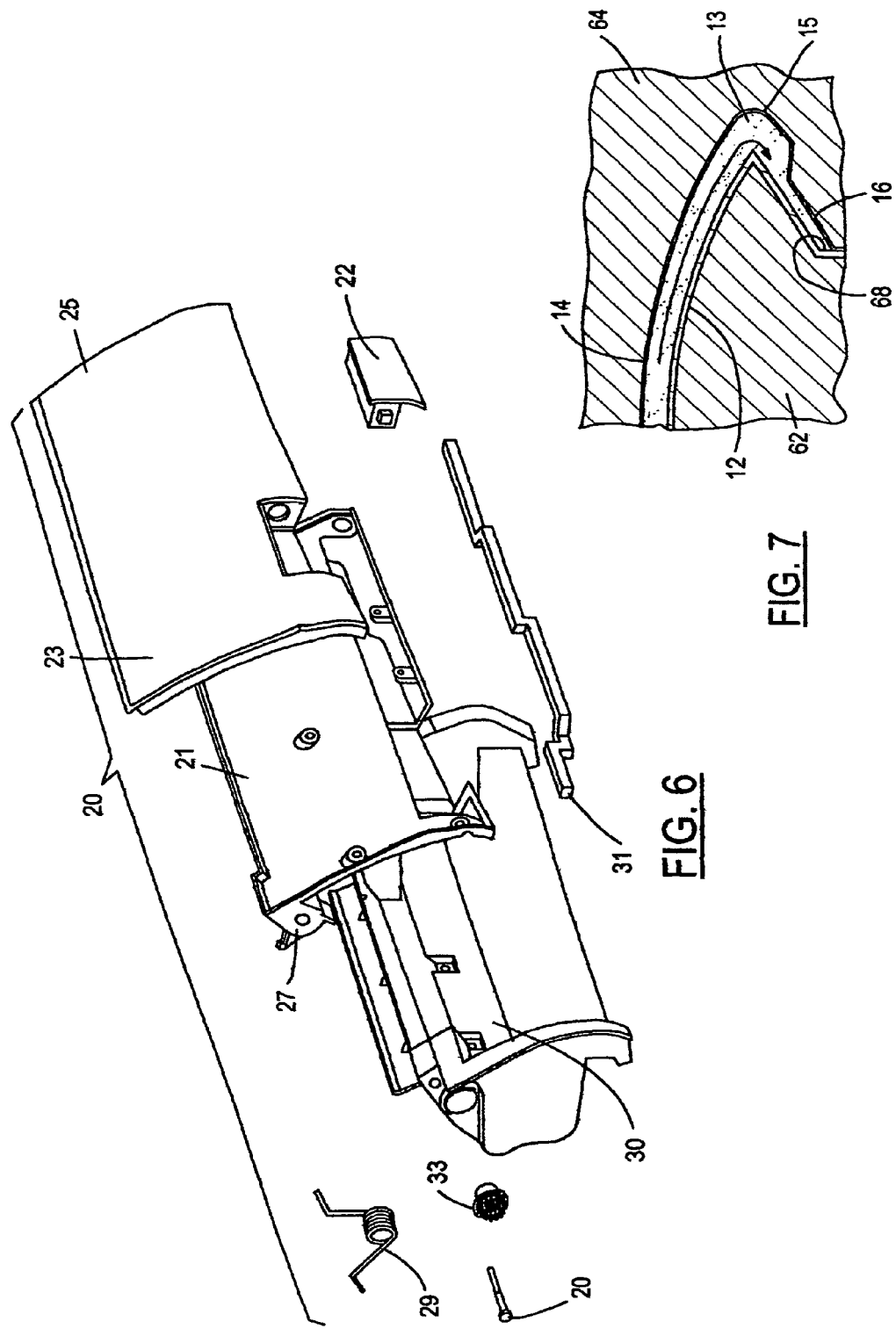

UPPER GLOVE BOX ASSEMBLY

BACKGROUND

1. Field of the Invention

This invention relates to the field of glove boxes for automotive vehicles and more specifically to an upper glove box with an upwardly hinged door.

2. Description of the Prior Art

An integrated appearance is an important attribute for glove boxes used in the passenger side of automotive vehicles. Also, it is desirous to locate the glove box upwards of the knee bolster of the instrument panel in order to provide easier access. However, in prior attempts to implement such an upper glove box, there was a visible space "reveal" between the upper edge of the door and the instrument panel that resulted in an unfinished appearance. In order to provide an acceptable appearance in the revel space, it was necessary to provide an instrument panel surface that was hard so that it could be molded to provide a continuation of the hard instrument panel surface into the reveal space and provide an acceptable appearance. It was not known how to provide the more preferred soft instrument panel surface covering in such a way that the material could be extended into the reveal space behind the upper glove box door.

SUMMARY OF THE INVENTION

The present invention is directed to an improved upper glove box in which a soft foam material with a flexible skin can be overlaid on the rigid instrument panel substrate and into the reveal space above the glove box door.

In particular, an upper glove box for the front passenger side of an automotive vehicle is disclosed for installation in an instrument panel having an underlying rigid substrate and an outer flexible skin finish surface over an intermediate layer of relatively soft cushioning material forward of the passenger position. The glove box structure includes a bin and the structure has upper, lower and side panels to define the volume of the bin. The instrument panel is formed to have an upper portion of the finish surface near a horizontal plane and is extended towards the passenger position to form a curved over finish surface visible by the passenger. The instrument panel is further formed to have a glove box installation receptacle with an upper portion of the receptacle having a downwardly directed finished surface extension of the curved over finish surface containing the flexible skin and intermediate layer. The glove box structure is mounted within the instrument panel receptacle and together therewith forms a void between the upper panel of the glove box and the finished surface extension portion of the instrument panel. A door panel is mounted to the upper portion of the glove box structure for rotational movement upward and outward during opening and downward and inward during closing, about a predetermined axis. The door panel has defined upper and lower edges, wherein the upper edge of the door panel enters into the void when door panel is opened and the upper edge of the door panel exits the void when the door panel is closed. The flexible skin finish surface material used to form downwardly directed finished surface extension is visible to the passenger above the upper edge of the door panel when the door is closed and partially opened and provides an integrated appearance.

It is an object of the present invention to provide an upper glove box for the passenger side of an automotive vehicle in which the appearance of a continuous soft instrument panel material is visible in the reveal space above the closed or partially opened upwardly hinged door panel.

It is another object of the present invention to provide a technique for forming the instrument panel extension above an upper glove box receptacle to provide a finished appearance in the reveal space.

It is a further object of the present invention to provide a unique upper glove box in which an upwardly opening door panel is controlled with a spring damper to resist the spring bias forces provided to open the door panel when its latch is released.

BRIEF DESCRIPTION OF THE DRAWINGS

FIG. 6 is an exploded view of the major components employed in an embodiment of the upper glove box invention.

FIG. 7 is a cross-sectional view of a mold used to create the revealed area shown in FIG. 2.

DETAILED DESCRIPTION

Figure 1:
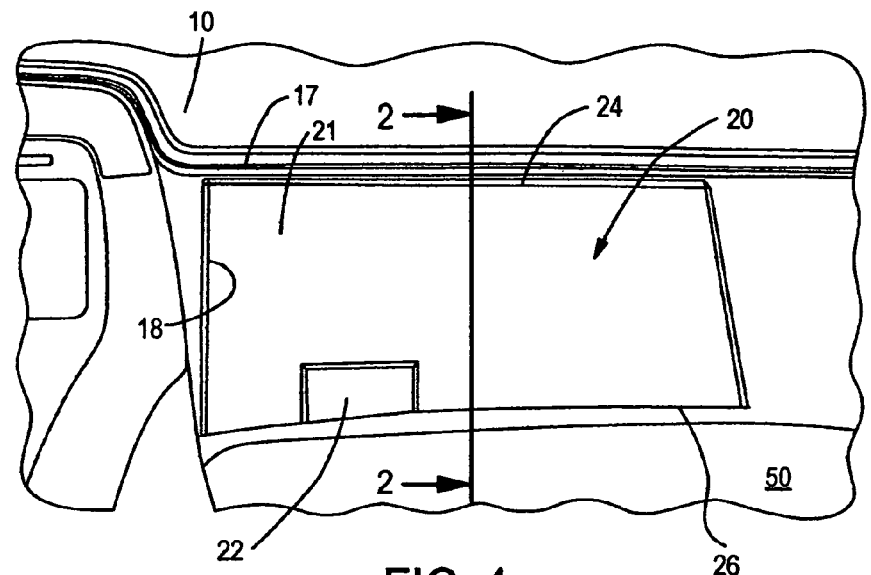
FIG. 1 is a plan view of a portion of an instrument panel showing an embodiment of the upper glove box door panel of the present invention in its closed position.
Figure 2:
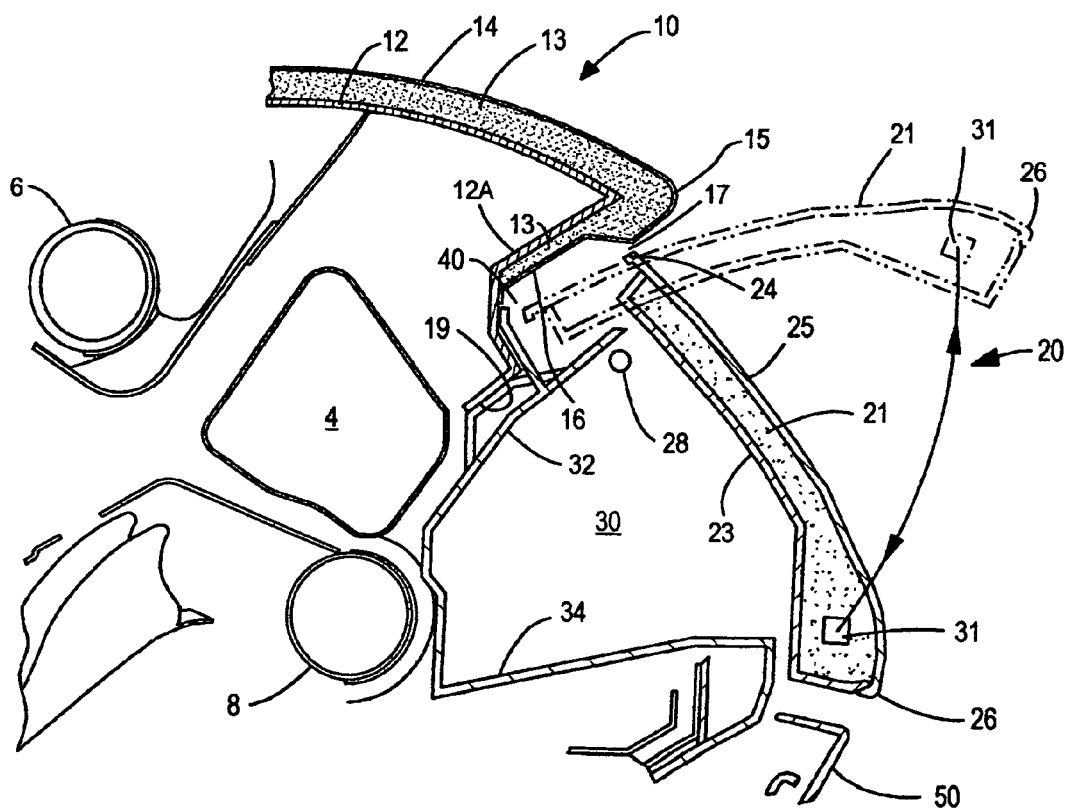
FIG. 2 is a cross-sectional view of the upper glove box of an embodiment of the present invention taken along section line 2-2 in FIG. 1.
Figure 3:
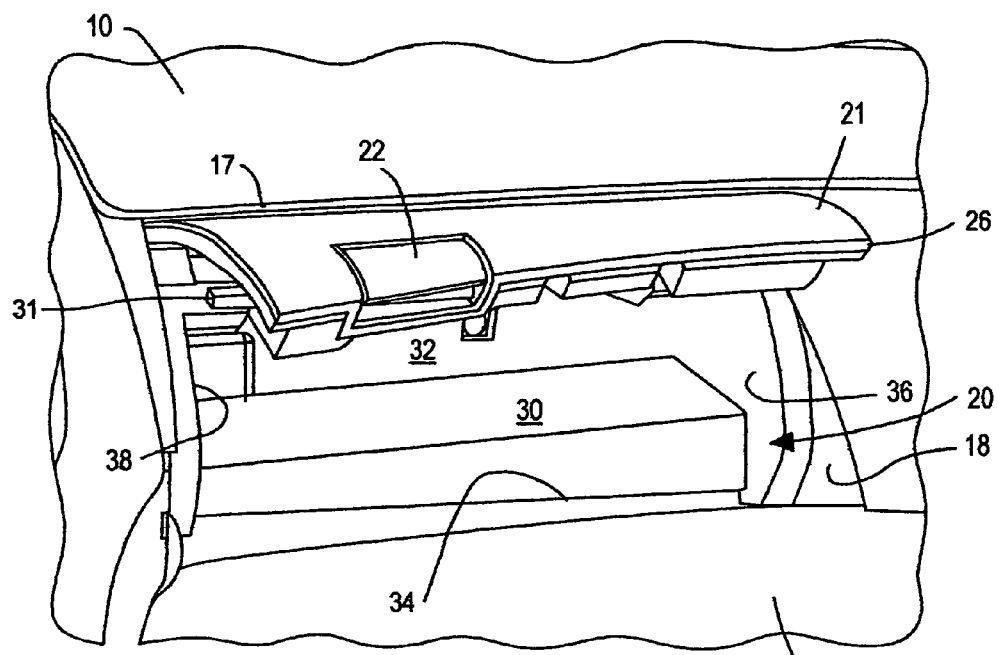
FIG. 3 is a plan view of a portion of an instrument panel showing an embodiment of the upper glove box door panel of the present invention in its open position

In FIGS. 1, 2 and 3 an upper glove box 20 embodiment of the present invention is shown as located on the passenger side of an automotive vehicle. A passenger side instrument panel 10 extends towards the passenger position from the forwardly locate windshield (not shown). An upper glove box door panel 21 is shown in its closed position in FIG. 1. The door panel 21 includes a manually activated latch 22 and upper and lower edges 24 and 26 respectively. The glove box 20 is located above a knee bolster 50 within an instrument panel receptacle 18.

In FIG. 2, the cross-section view is taken along section line 2-2 in FIG. 1. It shows the instrument panel 10 being made up of a rigid substrate material 12 that is over coated with a relatively soft foam material 13 and finished flexible skin 14. The upper glove box 20 is mounted below the instrument panel 10 and is attached to an extension 19 of substrate 12 and a cross beam 8. Other items such as a passenger side air bag 4 and another cross member 6 are also represented to show a general reference for the environment of the embodiment. The upper glove box 20 defines a storage container 30 that is defined by upper wall panel 32, lower floor panel 34, and side wall panels 36 and 38 (shown in FIG. 3). The door panel 21, in this embodiment, is made up of an inner panel 23 and an outer panel 25 in order to contain a latching mechanism and release rod 31 that is released by manual activation of the latch handle 22. Although the latching mechanism is not shown here in detail, a similar mechanism is shown in U.S. Patent Application Publication 2004/0189012, which is incorporated herein by reference.

The door 20 is shown in phantom lines to open upwards by rotation about a generally horizontal axis indicated at hinge pin 28. A void 40 is formed between the back side of upper wall 32 and instrument panel 10 to receive the upper edge 24 when it is opened. An opening 17 exists over the length of the door between the instrument panel 10 and the outer surface of the door panel 20 when the door is being opened, as well as and to a lesser extent above upper edge 24 when the door is closed.

The instrument panel 10 is formed to have a forward portion of the finish surface 14 near a horizontal plane and a rearward portion that extends towards the passenger position to form a curved over finish surface 15 and surface wall 16 is visible by the passenger through opening 17. The instrument panel 10 is further formed to have a glove box installation receptacle 18 into which the glove box 10 is nested and installed. An upper portion of the receptacle 18 has a downwardly directed rigid substrate portion 12A to support both the curved over finish surface 15 containing the flexible skin 14 and intermediate foam layer 13 which defines the surface wall 16. The surface wall 16 becomes the revealed and visible area of the void 40 through opening 17.

Figures 4, 5:
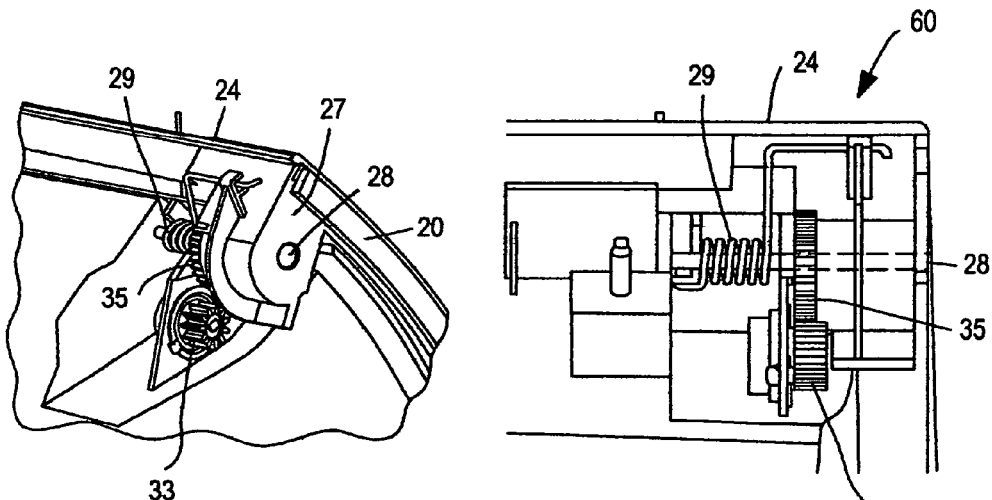
FIG. 4 is a perspective view of a portion of a door hinge employed in the preferred embodiment of the present invention.
FIG. 5 is a plan view of a portion of a door hinge employed in the preferred embodiment of the present invention.

FIGS. 2, 4 and 5 illustrate the hinge used in the present embodiment. A hinge pin 28 is located at each side of the door panel 20 to define the axis of rotation for the door panel. A hinge arm 27 connects the door panel 20 to the hinge pin 28 and provides an offset by a predetermined distance for door rotation that allows the upper door edge 24 to travel forward in an arcuate path and into the void 40 when the door panel is opened. A torsion spring 29 surrounds hinge pin 28 and is connected between a stationary portion of the glove box structure and the hinge arm 27 to provide biasing force to the door panel when it is released for opening. The biasing force causes the door to fully open and to hold the door open thereafter until it is closed by opposing forces, manually applied in this embodiment. In order to control the speed that the door panel 20 is opened by the spring 29, a friction damper 33 is provided which, in this embodiment, is gear driven by hinge gear 35. The friction damper offers resistance and causes the door to open relatively slowly and in a controlled manner to its fully opened position.

FIG. 6 shows the basic major elements of the embodiment of the upper glove box embodiment 20. The container 30, the inner door panel 23, the outer door panel 25, the latch handle 22, the release rod 31, the torsion spring 29, hinge pin 28 and friction damper 33.

In FIG. 7, a portion of an instrument panel mold configuration is shown that allows the curve over portion of the instrument panel to be formed. In this configuration, a pair of mold preforms, 62 and 64 are shown in cross-section with the appropriate face configurations to allow the substrate 12 to be secured in place and the smooth shape of the flexible skin 14 to be established during an injection molding process. The curve over surface 15 and revealed surface wall 16 are defined by the surface 66 of mold preform 64. A stop 68 is defined at the lower end of the portion that corresponds with the lower end of void 40 and the foam material 13 is injected into the instrument panel mold. As the foam material flows into the area shown in FIG. 7, the surface wall 16 takes the predetermined shape and is limited by the stop 68.

It can be seen by the drawings and accompanying explanation, the present invention is a unique improvement over conventional passenger side glove boxes. And while the embodiment shown here is the preferred embodiment, it shall not be considered to be a restriction on the scope of the claims set forth below.

We claim:

1. An upper glove box assembly for an automotive vehicle comprising:

an instrument panel having an underlying rigid substrate and an outer flexible skin finish surface over an intermediate layer of relatively soft cushioning material;

a glove box structure that includes a bin for holding articles, wherein said structure has upper, lower and side panels to define the volume of said bin;

said instrument panel formed to have an upper portion of said flexible skin finish surface near a horizontal plane and extended to form a curved over finish surface;

said instrument panel further formed to have a glove box installation receptacle with an upper portion of said receptacle having a downwardly directed finished surface extension portion of said curved over finish surface containing said flexible skin finish surface and intermediate layer;

said glove box structure mounted within said glove box installation receptacle of said instrument panel and together therewith forming a void between said upper panel of said glove box and said finished surface extension portion of said instrument panel;

a door panel mounted to said glove box structure for rotational movement upward and outward during opening and downward and inward during closing about a predetermined axis; and said door panel having defined upper and lower edges, wherein said upper edge of said door panel enters into said void during opening of said door panel and said upper edge of said door panel exits said void when said door panel is closed to reveal said finish surface extension portion within said void during said rotational movement of said door panel.

2. An upper glove box as in claim 1, wherein said intermediate layer of said instrument panel is an injected foam material.

3. An upper glove box as in claim 2, wherein said door panel is mounted on a hinge attached to said glove box structure to provide rotation movement about said predetermined axis.

4. An upper glove box as in claim 3, wherein said predetermined axis is substantially horizontal.

5. An upper glove box as in claim 4, wherein said axis is offset from said door panel and said upper edge of said door panel to allow said upper edge of said door panel to travel an arcuate path that extends into said void when said door panel is opened.

6. An upper glove box as in claim 5, wherein said hinge includes a spring to apply bias force to rotate said door panel into an open position.

7. An upper glove box as in claim 6, wherein said hinge includes a damper element to provide friction opposition to said spring bias force and control the speed of said door panel opening due to said bias force of said spring.

8. An upper glove box as in claim 7, wherein said glove box structure includes a lower latch that interacts with a manually activated release mechanism on said door panel to secure said door panel when said door panel is in a closed position and to release said door panel when said mechanism is manually activated and said door panel opens via said spring applied bias force.

9. An upper glove box as in claim 6, wherein said spring is a torsion spring that is mounted to surround a hinge pin oriented along said axis.

10. An upper glove box as in claim 1, wherein said instrument panel is formed by an injection molding process in which foam material is injected into said downwardly directed finished surface extension as said intermediate layer.

11. An upper glove box as in claim 10, wherein said finished surface extension portion has the same surface appearance as said upper portion of said instrument panel.

12. An upper glove box as in claim 1, wherein said predetermined axis is offset from said door panel by a predetermined distance and said upper edge of said door panel to allow said upper edge of said door panel to travel an arcuate path that extends into said void when said door panel is opened.

13. An upper glove box assembly for an automotive vehicle comprising:
   an instrument panel having an underlying rigid substrate and an outer flexible skin finish surface over an injection molded intermediate layer of foam material;
   a glove box structure that includes a container for holding articles, wherein said glove box structure has upper, lower and side panels to define the volume of said container;
   said instrument panel formed to have an upper portion generally approximating a horizontal plane and further formed with a curved over portion above said upper glove box;
   said instrument panel further formed to receive said upper glove box structure with a visible and downwardly directed finished surface extension portion of said curved over portion containing said flexible skin finish surface and intermediate layer;
   said glove box structure mounted below said instrument panel and together therewith forming a void between the upper panel of said glove box structure and said finished surface extension portion of said instrument panel;
   a door panel mounted to said glove box structure for rotational movement upward and outward during opening and downward and inward during closing about a generally horizontal axis; and
   said door panel having a defined upper edge, wherein said upper edge of said door panel travels in an arcuate path, wherein said upper edge of said door panel enters into said void when said door panel is opened, and wherein said upper edge of said door panel exits said void when said door panel is closed to reveal said finished surface extension portion within said void during said rotational movement of said door panel.

* * * * *